Feb. 18, 1936.   H. S. EBERHARD   2,031,303
TRACTOR
Filed Feb. 7, 1934
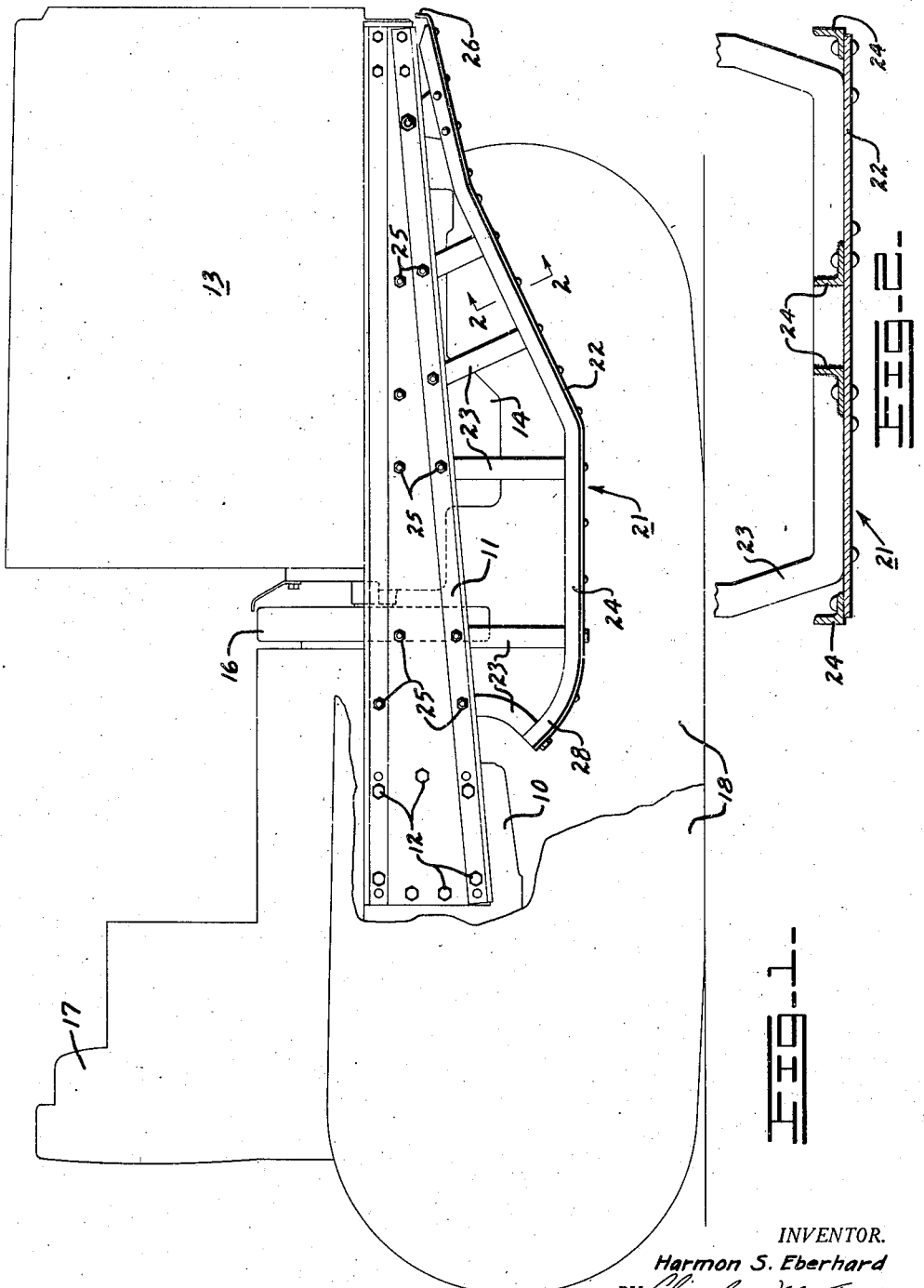
INVENTOR.
Harmon S. Eberhard
BY Charles M. Fryer
ATTORNEY.

Patented Feb. 18, 1936

2,031,303

UNITED STATES PATENT OFFICE 2,031,303

TRACTOR

Harmon S. Eberhard, Peoria, Ill., assignor to Caterpillar Tractor Co., San Leandro, Calif., a corporation of California Application February 7, 1934, Serial No. 710,154

3 Claims. (Cl. 180—1)

The present invention relates to tractors, and more particularly to tractors having means for protecting parts of the tractor during operation thereof over obstructions encountered in rough, wooded or rocky country.

It is an object of the invention to provide a tractor having improved guard means for the underside of the tractor, designed to promote travel of the tractor over obstructions without injury to the tractor.

Another object of the invention is to provide guard means, of the character described, which will facilitate travel of the tractor in either direction over obstructions which are higher from the ground than the ground clearance of the tractor.

Another object of the invention is to provide a tractor having improved means to protect the tractor power plant from injury when the tractor is travelling over obstructions.

Another object of the invention is to provide a track-type tractor having a bottom surface formed to permit the tractor to back off of an obstruction when the tractor operator discovers that it is too high for the tractor to travel over.

Other objects will appear as the description progresses.

Description of figures

Fig. 1 is a more or less diagrammatic side elevation of a track-type tractor embodying the instant invention, one of the track mechanisms being partially broken away to better illustrate the construction.

Fig. 2 is a sectional view taken in the plane of the line 2—2 in Fig. 1.

Description of machine

The invention is disclosed as embodied in a track-type tractor, although it can be employed with any other type of tractor or other similar vehicle. With respect to tractors, such as track-type tractors, adapted for use in rough country where the machine must travel over obstructions such as stumps, rocks, and the like, it is desirable to protect the under side of the tractor, particularly the power plant thereof, from such obstructions. Heretofore, such protecting means has not permitted backing of the tractor over high obstructions. The present invention is designed to obviate this disadvantage.

In the form of the invention illustrated by the drawing, the tractor has a body or main frame (Fig. 1) including transmission case 10 and similar opposite side members 11, secured by bolts 12 to the sides of transmission case 10 and extending forwardly therefrom. A suitable bracing connection (not shown) is provided between the front ends of side members 11, only one of which members is seen in Fig. 1. Side members 11 extend forwardly in spaced relation to provide a mounting for the power plant including engine 13 positioned between the side members 11 and having crankcase 14. At the rear of engine 13, flywheel 16 is mounted immediately forward of an operator's station including seat 17. A plurality of suitable controls (not shown) is provided at the operator's station. The body portion of the tractor is supported in a conventional manner on opposite endless track mechanisms 18, as illustrated for example in the patent to Best No. 1,715,055, dated May 28, 1929.

Means is provided for protecting the underside of the tractor, chiefly the bottom of the crankcase and the flywheel, from injury by obstructions such as rocks, stumps, and the like, the protecting means being formed to allow the tractor to travel over obstructions of a greater height than the ground clearance of the tractor, which normally exists with the protecting means forming a part thereof. Crankcase guard 21 (Figs. 1 and 2) comprises plate 22 having a plurality of spaced-apart U-shaped frame members 23 riveted thereto and extending upwardly therefrom. Angles 24 (Fig. 2) brace the center and edges of plate 22. The open ends of U-shaped members 23 (Fig. 1) are secured by a plurality of bolts 25 to respective side members 11 to mount guard 21 on the tractor. From inspection of Fig. 1, it is seen that centrally thereof guard 21 has a portion substantially parallel with the ground; and as is usual with respect to such guards heretofore employed, the front end of the guard is curved or inclined upwardly. Such front end of the guard is substantially in the plane of frame side members 11, and terminates in an upwardly extending lip 26. In the present invention, the rear end 28 of the guard is also curved or inclined upwardly. Thus, should the tractor be driven partially over an obstruction with the obstruction still projecting beyond the rear end of the guard, and should the operator find such obstruction too high for clearance, the upwardly slanting rear deflecting end of the guard will permit the tractor to be driven backwardly off of the obstruction. Also, the tractor can be driven rearwardly over any obstruction whose upper end will strike below the top edge of rear end 28 of the guard, and over certain higher obstructions whose top contours are curved or inclined so as to avoid catching on such top edge. With respect to guards previously employed and which were not provided with the deflecting end of the instant invention, the rear end of the guard would become caught in the obstruction if an effort were made to back the tractor off of the obstruction.

Because of the provision of the upwardly slanting deflecting ends at both the rear and the front end of the guard, it will be apparent that the tractor can be very readily driven either forwardly or rearwardly over obstructions; and, at the same time, vital portions at the underside of the tractor are well protected from such obstructions.

Therefore, I claim as my invention:

1. In a tractor adapted for use in rough country to travel over obstructions such as stumps, rocks, and the like, a guard under said tractor and having an upwardly slanting rear end to provide deflecting means for allowing the tractor to be backed off of an obstruction.

2. In a tractor adapted for use in rough country to travel over obstructions such as stumps, rocks, and the like, a transmission case at the rear end of said tractor, a power plant including a crankcase at the front of said tractor and a flywheel between said crankcase and said transmission case, and a guard mounted below said crankcase and extending rearwardly past said flywheel to a point adjacent said crankcase, the rear end of said guard slanting upwardly.

3. A guard for protecting the underside of a tractor to adapt said tractor for travel over obstructions such as stumps, rocks, and the like, and having an upwardly slanting rear end to provide deflecting means for allowing the tractor to be backed off of an obstruction.

HARMON S. EBERHARD.